United States Patent
Kono et al.

(10) Patent No.: US 12,515,618 B2
(45) Date of Patent: Jan. 6, 2026

(54) VEHICLE CONTROL DEVICE, CONTROL METHOD OF VEHICLE, AND STORAGE MEDIUM

(71) Applicant: HONDA MOTOR CO., LTD., Tokyo (JP)

(72) Inventors: Satoshi Kono, Tokyo (JP); Nobuaki Komiya, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 73 days.

(21) Appl. No.: 18/539,963

(22) Filed: Dec. 14, 2023

(65) Prior Publication Data
US 2024/0227735 A1 Jul. 11, 2024

(30) Foreign Application Priority Data
Jan. 10, 2023 (JP) .................... 2023-001715

(51) Int. Cl.
*B60R 25/40* (2013.01)
*B60R 25/24* (2013.01)
(Continued)

(52) U.S. Cl.
CPC ............ *B60R 25/403* (2013.01); *B60R 25/24* (2013.01); *G07C 9/00309* (2013.01);
(Continued)

(58) Field of Classification Search
CPC ... B60R 25/403; B60R 25/24; G07C 9/00309; G07C 2009/00793; G07C 2009/00984;
(Continued)

(56) References Cited

U.S. PATENT DOCUMENTS

| 4,819,170 A * | 4/1989 | Shimizu ............... B62D 5/0463 701/41 |
| 7,750,497 B2 * | 7/2010 | Hashimoto ............... H02J 1/14 307/10.1 |

(Continued)

FOREIGN PATENT DOCUMENTS

| JP | 2005-335635 A | 12/2005 |
| JP | 2007-106346 A | 4/2007 |

(Continued)

OTHER PUBLICATIONS

Japanese Office Action dated Nov. 19, 2024 issued in corresponding Japanese application No. 2023-001715; English machine translation included (7 pages).

*Primary Examiner* — Thomas D Alunkal
(74) *Attorney, Agent, or Firm* — Rankin, Hill & Clark LLP

(57) ABSTRACT

A vehicle control device, including: a switch unit that disconnects power supply to at least one of a drive system device involved in driving of a vehicle and a drive control unit that controls the drive system device; a switch control unit that controls the switch unit; and an event detection unit that detects an occurrence of a specific event in the vehicle, wherein the switch unit is capable of switching between an on state for performing the power supply and an off state for stopping the power supply, and the switch control unit switches the switch unit to the on state with reception of an on control signal from a control device as a trigger, and switches the switch unit to the on state without receiving the on control signal, when the specific event occurs.

7 Claims, 4 Drawing Sheets

(51) Int. Cl.
*G07C 9/00* (2020.01)
*H04L 12/40* (2006.01)

(52) U.S. Cl.
CPC .... *H04L 12/40* (2013.01); *G07C 2009/00793* (2013.01); *G07C 2009/00984* (2013.01); *H04L 2012/40215* (2013.01); *H04L 2012/40273* (2013.01)

(58) Field of Classification Search
CPC .......... H04L 12/40; H04L 2012/40273; H04L 2012/40215
See application file for complete search history.

(56) References Cited

U.S. PATENT DOCUMENTS

| | | | | |
|---|---|---|---|---|
| 8,583,308 | B2* | 11/2013 | Miyazaki | B60L 50/16 |
| | | | | 180/65.265 |
| 2018/0283080 | A1* | 10/2018 | Tamura | B60R 25/209 |
| 2021/0024035 | A1* | 1/2021 | Nakashima | G06Q 30/0645 |
| 2021/0046899 | A1* | 2/2021 | Uttam | H04W 4/021 |
| 2021/0270956 | A1* | 9/2021 | Yoshida | G01S 13/36 |

FOREIGN PATENT DOCUMENTS

| | | |
|---|---|---|
| JP | 2014-172480 A | 9/2014 |
| JP | 2019-156089 A | 9/2019 |

\* cited by examiner

VEHICLE CONTROL DEVICE, CONTROL METHOD OF VEHICLE, AND STORAGE MEDIUM

INCORPORATION BY REFERENCE

The present application claims priority under 35 U.S.C. § 119 to Japanese Patent Application No. 2023-001715 filed on Jan. 10, 2023. The content of the application is incorporated herein by reference in its entirety.

BACKGROUND OF THE INVENTION

Field of the Invention

The present invention relates to a vehicle control device, a control method of a vehicle, and a storage medium.

Description of the Related Art

In recent years, there is an increased effort to provide access to sustainable transportation systems in consideration of even those vulnerable among traffic participants. In order to achieve this goal, efforts in research and development are focused on further improvement in traffic safety and convenience through research and development related to achievement of both the security and operability of a vehicle. For example, Japanese Patent Laid-Open No. 2005-335635 discloses a device that collates an identification code stored in a vehicle key and operates an ECU and an IPDM, which control start-up of an engine of a vehicle, based on the result of collation of the identification code.

As disclosed in Japanese Patent Laid-Open No. 2005-335635, when the processing, such as collation or authentication, is required before starting the device mounted on the vehicle, a process to start the device is performed after the processing is complete. As a result, it takes a long time until the device is started up after a user performs operation, and this causes an issue of a low response performance.

The present invention has been made in view of such background circumstances, and it is an object of the present invention to shorten, in the configuration where processing is required before a device mounted on a vehicle is started up, the time until the device is started up in order to enhance the response performance. Accordingly, the present invention contributes to the development of sustainable transportation systems.

SUMMARY OF THE INVENTION

One aspect for achieving the above object relates to a vehicle control device. The vehicle control device includes: a switch unit that disconnects power supply to at least one of a drive system device involved in driving of a vehicle and a drive control unit that controls the drive system device; a switch control unit that controls the switch unit; and an event detection unit that detects an occurrence of a specific event in the vehicle. The switch unit is capable of switching between an on state for performing the power supply and an off state for stopping the power supply. The switch control unit switches the switch unit to the on state with reception of an on control signal from a control device as a trigger, and switches the switch unit to the on state without receiving the on control signal, when the specific event occurs.

According to the above device, it is possible to swiftly start power supply to at least one of the drive system device involved in driving of the vehicle and the drive control unit that controls the drive system device. This makes it possible to swiftly put the vehicle in a drivable state and to enhance the response performance.

DETAILED DESCRIPTION OF THE PREFERRED EMBODIMENTS

1. Configuration of Vehicle Control Device

Figure 1:
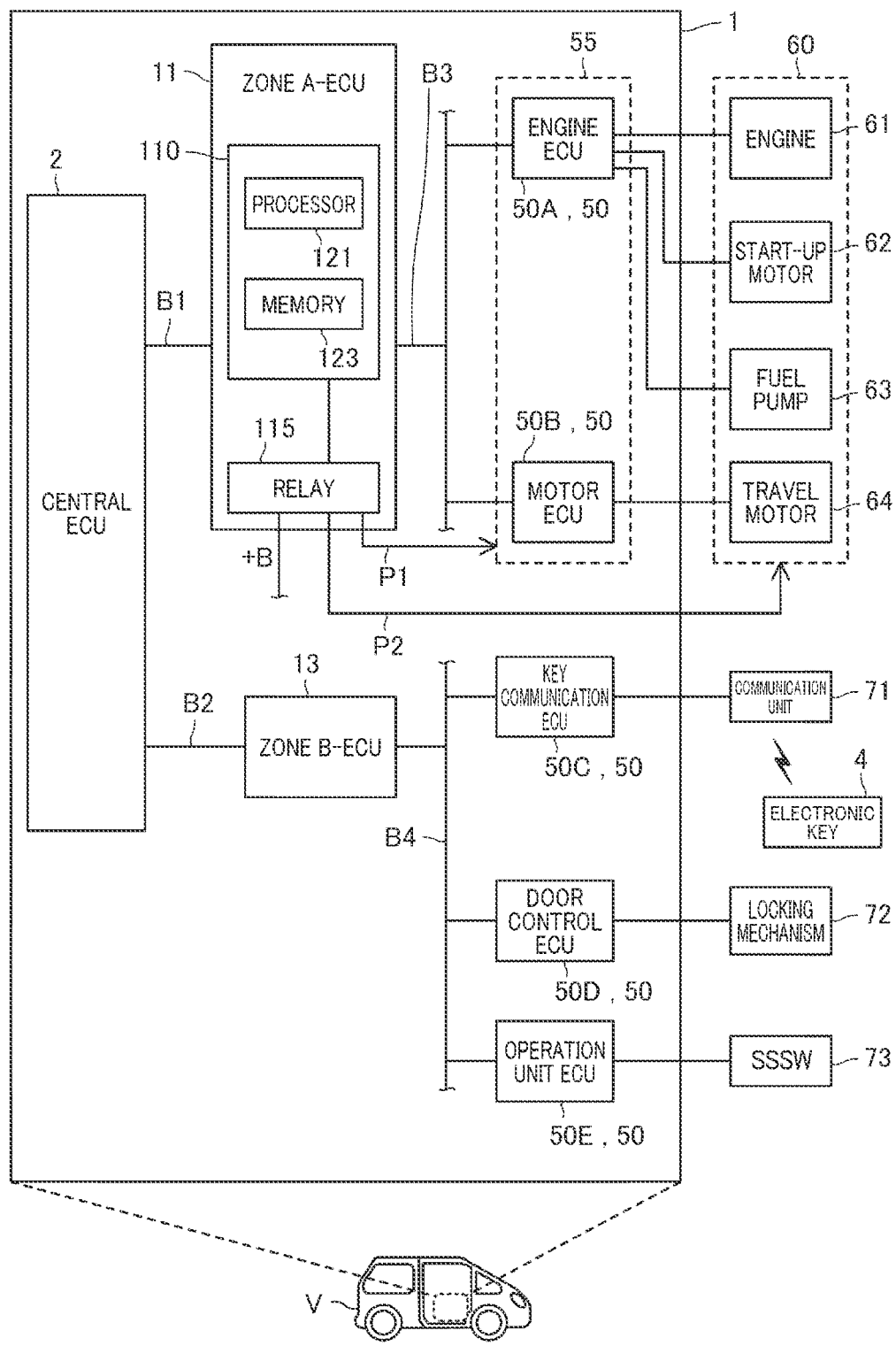
FIG. 1 is a block diagram of a vehicle control device.

FIG. 1 is a diagram showing a vehicle control device 1.
The vehicle control device 1 is constituted of a plurality of electronic control units (ECUs) 50 that control functional units mounted on a vehicle. The vehicle control device 1 controls the functional units of the vehicle to implement travel and various functions of the vehicle.

Specific aspects of the vehicle mounted with the vehicle control device 1 are not limited. The vehicle may be a four-wheeled vehicle or may be a motorcycle or another mobile object. The vehicle may be a vehicle that uses an internal combustion engine as a drive source, an electric vehicle that uses a motor as the drive source, or a hybrid vehicle that uses the internal combustion engine and the motor. The present embodiment will be described with a vehicle V, which is a four-wheeled vehicle, as an example.

The vehicle control device 1 includes a central ECU 2 that performs general control and information processing of the vehicle V. The central ECU 2 is connected to communication lines including communication lines B1 to B4. The central ECU 2 implements the function of a gateway that manages transfer of communication data among these communication lines. The central ECU 2 corresponds to an example of a master control unit in the present disclosure, and respective ECUs, on which programs are written by the central ECU 2, correspond to examples of vehicle control units. The vehicle control units include, for example, a zone A-ECU 11, a zone B-ECU 13, and each ECU 50 shown in FIG. 1.

Figure 2:
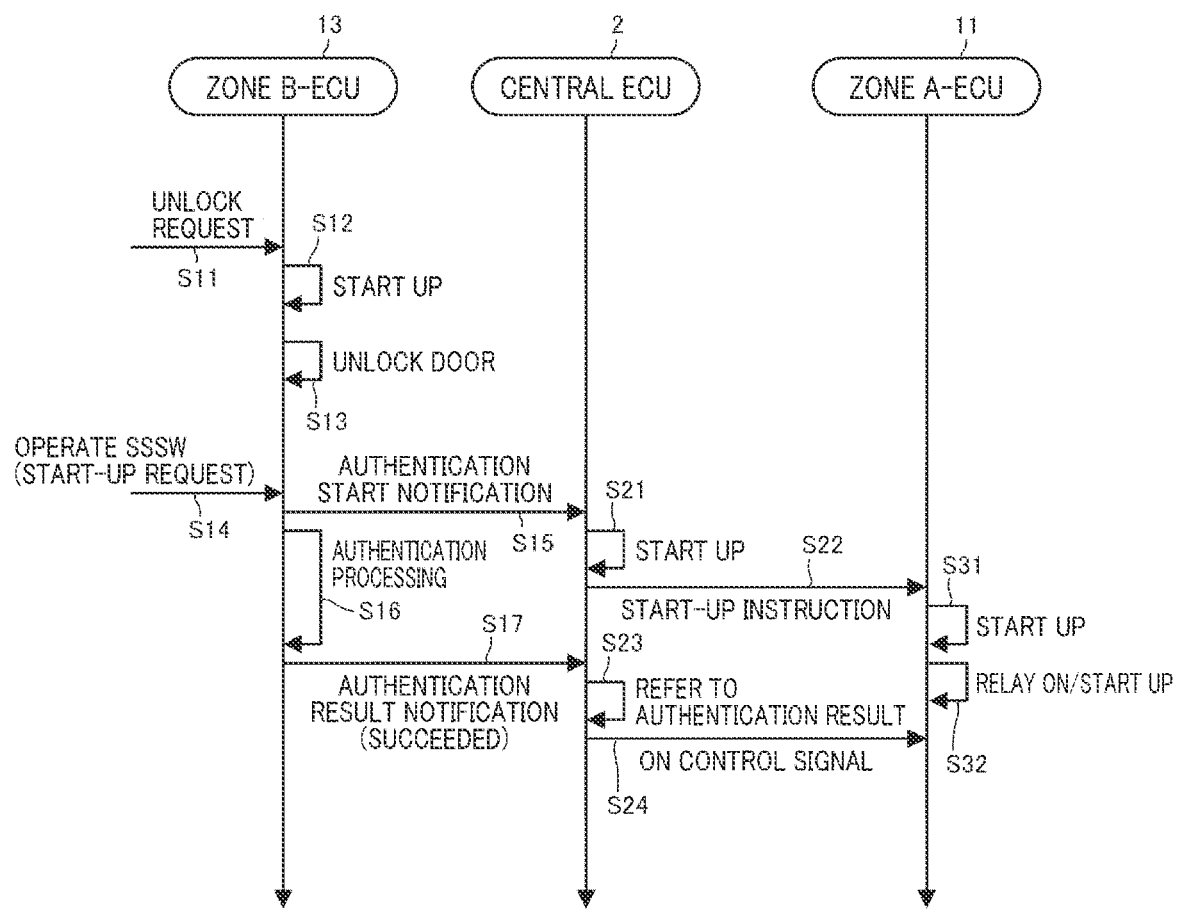
FIG. 2 is a sequence diagram showing an operation example of the vehicle control device.

In FIG. 1 and FIG. 2 described later, various ECUs connected to the central ECU 2, the zone A-ECU 11, and the zone B-ECU 13 are stated as the ECUs 50. In FIGS. 1 and 2, some of the ECUs 50 mounted on the vehicle V are schematically shown, and the number and connection relationship of the ECUs 50 connected to the central ECU 2, the zone A-ECU 11, and the zone B-ECU 13 are different depending on the specifications of the vehicle V.

The central ECU 2 is connected to the zone A-ECU 11 via the communication line B1 and is connected to the zone B-ECU 13 via the communication line B2. The zone A-ECU 11 and the zone B-ECU 13 are further connected to more ECUs 50 as described later. The zone A-ECU 11 manages transfer of communication data between the central ECU 2 and the ECUs 50 connected to the zone A-ECU 11. The zone B-ECU 13 manages transfer of communication data between the central ECU 2 and the ECUs 50 connected to the zone B-ECU 13. The communication line B1 corresponds to an example of a first communication line, and the communication line B2 corresponds to an example of a second communication line.

FIG. 1 shows an engine ECU 50A and a motor ECU 50B as examples of the ECUs connected to the zone A-ECU 11. These ECUs are collectively referred to as a drive control unit 55. The vehicle control device 1 is also connected to a drive system device 60, which is mounted on the vehicle V and involved in driving of the vehicle V. An example of the drive system device 60 include an engine 61, a start-up motor 62, a fuel pump 63, and a travel motor 64 as shown in FIG. 1. The drive system device 60 is controlled by the drive control unit 55.

The engine ECU 50A is connected to the engine 61, the start-up motor 62, and the fuel pump 63. The motor ECU 50B is connected to the travel motor 64. The engine 61 and the travel motor 64 are the driving sources of the vehicle V. The vehicle V may include an unillustrated generator that generates power to operate the travel motor 64. The vehicle V may be configured to drive the generator by the engine 61.

The start-up motor 62 is used to start up the engine 61. The start-up motor 62 may be a so-called cell motor or a motor/generator having the function of generating regenerative power. The fuel pump 63 supplies the engine 61 with fuel from a fuel tank of the vehicle V. When the vehicle V is not mounted with the travel motor 64 as the driving source, the vehicle control device 1 does not include the motor ECU 50B. When the vehicle V is not mounted with the engine 61, the vehicle control device 1 does not include the engine ECU 50A.

The engine ECU 50A performs control of fuel supply to the engine 61, control of ignition timing in the engine 61, control of the start-up motor 62, acquisition of detection values of various sensors, and the like. Examples of various sensors may include O2 sensors, knock sensors, cam angle sensors, crank angle sensors, intake air temperature sensors, exhaust temperature sensors, coolant temperature sensors, and oil temperature sensors.

The motor ECU 50B controls the rotation speed of the travel motor 64. The travel motor 64 may include an inverter circuit that outputs drive current to the motor and may include various sensors. The motor ECU 50B may perform charge control, discharge control, and management of a remaining charge amount for a travel battery that supplies power to the travel motor 64.

The vehicle V includes a battery called a start-up battery or an auxiliary battery. When the vehicle V is an electric vehicle mounted with the travel motor 64, the vehicle V is also mounted with a travel battery. The start-up battery and the travel battery are constituted of, for example, lithium-ion secondary batteries, lithium polymer batteries, nickel hydrogen batteries, all-solid batteries, lead-batteries, or other secondary batteries, and may be capacitors. The motor ECU 50B may control a regenerative mechanism that generates regenerative power using traveling energy of the vehicle V.

FIG. 1 shows a key communication ECU 50C, a door control ECU 50D, and an operation unit ECU 50E as examples of the ECUs connected to the zone B-ECU 13.

The key communication ECU 50C controls a communication unit 71 included in the vehicle V. The communication unit 71 is a communication device (transmitter/receiver, circuit) that executes wireless communication with an electronic key 4 possessed by the user of the vehicle V. The electronic key 4 has a wireless communication function, identification information unique to the electronic key 4, and authentication information used in authentication processing described later. The electronic key 4 is, for example, a FOB key.

The communication unit 71 may include an external communication device that communicates with the electronic key 4 located outside the vehicle V and an internal communication device that communicates with the electronic key 4 located inside the vehicle V. The key communication ECU 50C executes communication with the electronic key 4 to process user access to the vehicle control device 1 from outside the vehicle and implement so-called smart entry operation.

When detecting the electronic key 4 within a predetermined range outside the vehicle V, the key communication ECU 50C collates the identification information held by the electronic key 4 with the identification information previously set in the vehicle control device 1. The key communication ECU 50C requests locking or unlocking to the zone B-ECU 13 when the collation is successful.

When the key communication ECU 50C requests unlocking, the zone B-ECU 13 performs control so that the door control ECU 50D controls a locking mechanism 72 to unlock the doors of the vehicle V. When the key communication ECU 50C requests locking, the zone B-ECU 13 also performs control to cause the door control ECU 50D to lock the locking mechanism 72.

The zone B-ECU 13 executes the authentication processing when the user performs an operation of requesting the start-up of the drive system device 60. An operation that triggers the authentication processing is, for example, an operation of the user requesting the start-up of the drive system device 60, that is, an operation of a start stop switch (SSSW) 73 to be specific.

Once starting the authentication processing, the zone B-ECU 13 causes the communication unit 71 to execute communication with the electronic key 4 and acquires the authentication information held by the electronic key 4. The zone B-ECU 13 collates the authentication information acquired from the electronic key 4 with the information generated for authentication by the zone B-ECU 13 and thereby determines whether or not the electronic key 4 is adapted to the vehicle V. When the electronic key 4 is adapted to the vehicle V, the zone B-ECU 13 determines that the authentication succeeded. When the electronic key 4 is not adapted to the vehicle V, the zone B-ECU 13 determines that the authentication failed. The zone B-ECU 13 notifies the central ECU 2 of the authentication result indicating the authentication succeeded or failed.

The central ECU 2 transmits a request to the zone A-ECU 11 based on the authentication result notified by the zone B-ECU 13. Specifically, the central ECU 2 transmits a request of starting up the drive system device 60 to the zone A-ECU 11 when the authentication result indicates that the authentication succeeded. In this case, the zone A-ECU 11 shifts the drive control unit 55 and the drive system device 60 to an operatable state and starts up the drive system device 60. The central ECU 2 also transmits a request not to start up the drive system device 60 to the zone A-ECU 11 when the authentication result indicates that the authentication failed. In this case, the zone A-ECU 11 stops the drive control unit 55 and the drive system device 60 or performs control to disable the drive control unit 55 and the drive system device 60 from starting up.

In the authentication processing, the zone B-ECU 13 and the electronic key 4 may use dynamic authentication information by generating the authentication information using a predetermined algorithm. It is also possible to use fixed authentication information held by the electronic key 4.

The door control ECU 50D controls the locking mechanism 72 included in the vehicle V. The locking mechanism 72 includes mechanisms (locks) for locking opening-and-closing parts such as doors, a rear gate, and a hood of the vehicle V, and actuators that operate the mechanisms. The locking mechanism 72 locks or unlocks the doors in accordance with the control of the door control ECU 50D. The locking mechanism 72 may include sensors that detect the opening and closing of the doors, the rear gate, and the hood included in the vehicle V.

The operation unit ECU 50E is connected to various switches, which allow the user to operate the vehicle V, and detects operations performed on the switches. For example, the operation unit ECU 50E is connected to the SSSW 73 and detects the operation of the SSSW 73.

Note that FIG. 1 shows an example of various ECUs 50 mounted on the vehicle V and devices controlled by the ECUs 50. The ECUs 50 included in the vehicle V, to which the present disclosure is applied, are not limited to those shown in FIG. 1 and are not limited to be connected as shown in FIG. 1. When the engine ECU 50A, the motor ECU 50B, the key communication ECU 50C, the door control ECU 50D, the operation unit ECU 50E, and other ECUs included in the vehicle control device 1 are not distinguished from each other, they are also stated as the ECUs 50.

The central ECU 2, the zone A-ECU 11, and the zone B-ECU 13 are connected to various ECUs as well as to the ECUs 50 shown in FIG. 1. For example, the central ECU 2 may be connected to a driving assist ECU that executes control to autonomously park the vehicle V at a parking position or executes an assist function when the driver parks the vehicle V. Examples of the functional units to be controlled by the driving assist ECU may include various cameras, a monitor, a touch panel, a steering device, a brake device, and an accelerator device mounted on the vehicle V. For example, the central ECU 2 may be connected to a vehicle to everything (V2X) communication device, a telematics control unit (TCU), an in-vehicle infotainment (IVI) control ECU, or the like. The V2X communication device includes a communication antenna and a communication circuit, which are not shown, and has a wireless communication function. The V2X communication device performs inter-vehicle communication and/or road-to-vehicle communication in accordance with the control of the central ECU 2. The TCU is a wireless communication device including a communication antenna and a communication circuit which are not shown. The TCU performs wireless data communication using cellular communication schemes, such as long term evolution (LTE) and 5th generation mobile communication system (5G). The IVI control ECU controls in-vehicle devices such as car navigation systems, various cameras including rear cameras, audio players, monitors, touch panels, operating elements such as keys and switches, speakers, and microphones.

The zone A-ECU 11 may be connected to, for example, an ECU that controls the travel battery of the vehicle V and an ECU that controls a transmission mechanism. The zone A-ECU 11 may also be connected to an ECU that executes a vehicle stability assist (VSA) function that controls acceleration and braking to stabilize the travel of the vehicle V, and the like.

The zone B-ECU 13 may be connected to, for example, a light control ECU that controls lighting devices mounted on the vehicle V.

The central ECU 2, the zone A-ECU 11, the zone B-ECU 13, and the ECUs 50 are referred to as control units constituting the vehicle control device 1, and devices to be controlled by these control units are referred to as the functional units of the vehicle V.

The communication lines B1 to B4 connect the central ECU 2, the zone A-ECU 11, the zone B-ECU 13, and the various ECUs 50. The communication lines B1 to B4 may be constituted of a plurality of communication transmission channels conforming to various communication standards, and the respective communication lines B1 to B4 may be data transmission channels conforming to different communication standards. In other words, the specific configurations, transmission bands, and communication standards of the cables that constitute the communication lines B1 to B4 are optionally selected.

Examples of the communication standards applicable to the communication lines B1 to B4 may include controller area network (CAN), Ethernet (registered trademark), universal serial bus (USB), local interconnect network (LIN), and low voltage differential signaling (LVDS), though other standards may also be adopted. As the CAN standards, communication protocols, which enable high-speed communication including CAN flexible data rate (CAN FD), may be adopted, or a low-speed CAN communication protocols may be adopted.

The central ECU 2, the zone A-ECU 11, and the zone B-ECU 13 have functions to convert and mediate protocols in different communication schemes. Accordingly, since the vehicle control device 1 can adopt a mixture of communication schemes, appropriate communication schemes can be selected in accordance with the respective communication speeds required and the like by the central ECU 2, the zone A-ECU 11, the zone B-ECU 13, and other ECUs 50.

In the present embodiment, the communication lines B1 to B4 are the communication transmission channels that execute CAN communication. CAN communication is executed between the central ECU 2 and the zone A-ECU 11 and between the central ECU 2 and the zone B-ECU 13 via the communication lines B1 and B2. CAN communication is also executed between the zone A-ECU 11 and the ECUs 50 and between the zone B-ECU 13 and the ECUs 50 via the communication lines B3 and B4.

The zone A-ECU 11 includes a processing unit 110 and a relay 115. The processing unit 110 executes control of the ECUs 50 connected to the zone A-ECU 11 and control of communication with the central ECU 2 and the ECUs 50. The processing unit 110 also controls the relay 115. The processing unit 110 and the relay 115 may be mounted on separate substrates, or the relay 115 may be mounted on the same substrate as the processing unit 110.

The relay 115 may be an electromagnetic relay or may be constituted of a semiconductor device. For example, a switching element, such as metal oxide semiconductor field effect transistors (MOSFETs) or insulated gate bipolar transistors (IGBTs), can be used as the relay 115. The relay 115 may also use an intelligent power device (IPD) including a switching element, a protection circuit, and an energy absorption circuit.

The relay 115 is connected to a +B power source, which is a main power source of the vehicle V. The relay 115 is connected to a power source line that outputs a power source P1 to the drive control unit 55 and a power source line that outputs a power source P2 to the drive system device 60 to disconnect the power source lines from the +B power source. The relay 115 is switched on and off under the control of the processing unit 110. In the on state, the relay 115 outputs the power source P1 of the drive control unit 55 and the power source P2 of the drive system device 60. Therefore, the processing unit 110 can perform control to start the drive control unit 55 and the drive system device 60, and control to stop the drive control unit 55 and the drive system device 60 by switching the on state and the off state of the relay 115.

The relay 115 corresponds to an example of the switch unit of the present disclosure. The zone A-ECU 11 corresponds to an example of the switch control unit, the central ECU 2 corresponds to an example of the event detection unit, and the zone B-ECU 13 corresponds to an example of the authentication unit.

The processing unit 110 includes a processor 121 and a memory 123.

The processor 121 is a computer constituted of, for example, a central processing unit (CPU), a micro controller unit (MCU), and a micro processor unit (MPU). The memory 123 (storage medium) is a rewritable nonvolatile storage device that stores programs executed by the processor 121, and data processed by the processor 121. The memory 123 is constituted of, for example, a semiconductor storage device, such as flash read only memories (ROMs) or solid state disks (SSDs), or a magnetic storage device. The memory 123 may include a random access memory (RAM) that forms work areas for temporarily storing programs and data. The processing unit 110 may be constituted of an integrated circuit (IC) that integrally includes the processor 121 and the memory 123. The memory 123 stores, for example, a control program for the processor 121 to implement the function of the zone A-ECU 11.

Each of the central ECU 2, the zone B-ECU 13 and the ECUs 50 may be also configured to have a processor (computer) and a memory (storage medium).

2. Operation of Vehicle Control Device

Figure 3:
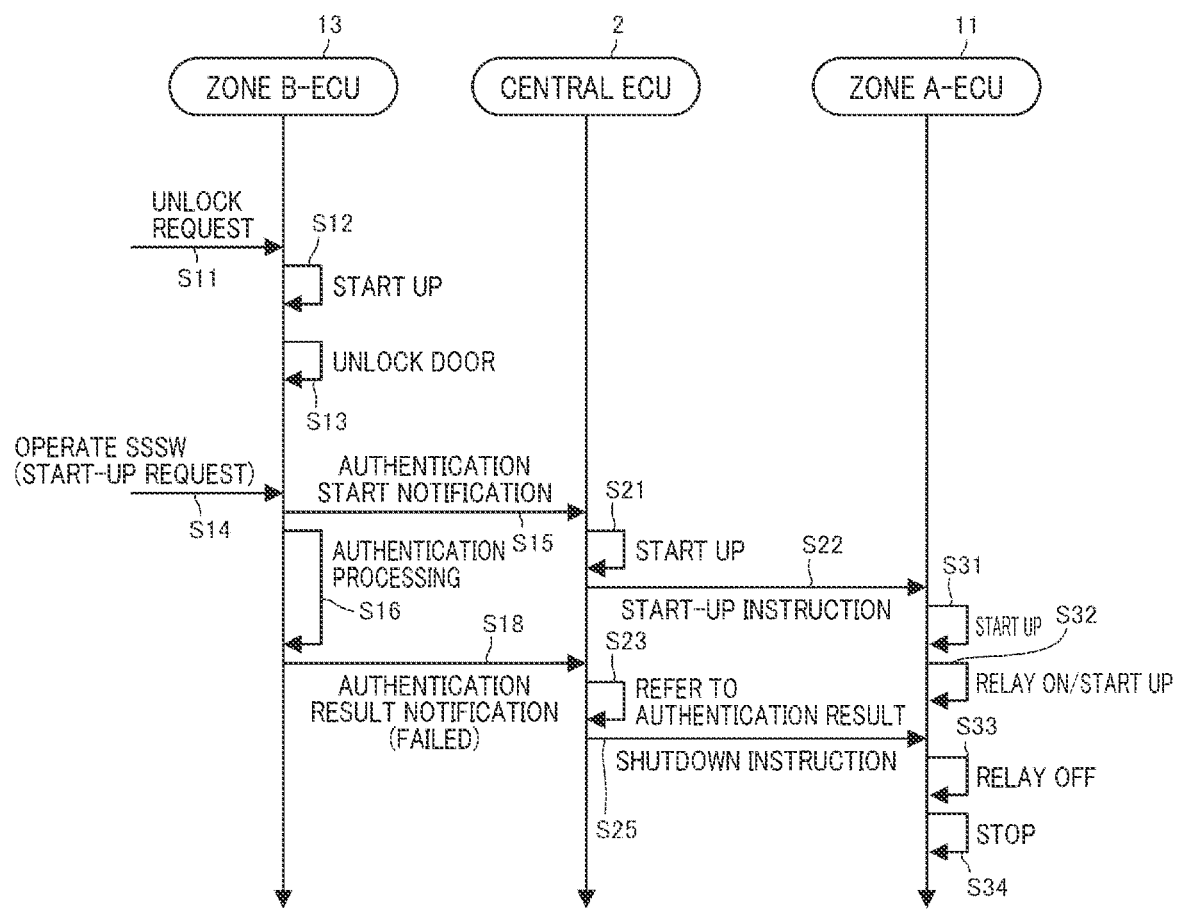
FIG. 3 is a sequence diagram showing the operation example of the vehicle control device.

FIGS. 2 and 3 are sequence diagrams showing the operation examples of the vehicle control device 1. FIGS. 2 and 3 show the operation of the vehicle control device 1 when the user starts up the drive system device 60 using the electronic key 4 while the vehicle V is in a stopped state. The vehicle V is in the stopped state when the drive system device 60 is not in operation so that power supply to the drive system device 60 needs to be started. This state corresponds to the state where, for example, the vehicle V is parked and no user having the electronic key 4 is in the vehicle V. In this state, the operation of the vehicle control device 1 is stopped, and the central ECU 2, the zone A-ECU 11, and the zone A-ECU 11 are stopped or in a power-saving state that consumes less power than the time of normal operation. The time of normal operation of the vehicle control device 1 is when the vehicle V is traveling, for example.

There is a difference in operation of the vehicle control device 1 between the case where the central ECU 2 detects the occurrence of a specific event in the vehicle control device 1 and the case where the central ECU 2 does not detect the occurrence when the zone A-ECU 11 switches the relay 115 from off to on. Hereinafter, the operation when the authentication processing by the zone B-ECU 13 is set as the specific event will be described as an example with reference to FIGS. 2 and 3.

The operations shown in FIGS. 2 and 3 are examples of a control method of a vehicle in the present disclosure, and a control program executed by the processor 121 to implement the control method of a vehicle corresponds to an example of the program of the present disclosure.

In FIG. 2, steps S11 to S17 are operations of the zone B-ECU 13, steps S21 to S24 are operations of the central ECU 2, and steps S31 to S32 are operations of the zone A-ECU 11.

When the communication unit 71 detects the electronic key 4 adapted to the vehicle V outside the vehicle V, the key communication ECU 50C inputs into the zone B-ECU 13 an unlock request to unlock the doors of the vehicle V. The zone B-ECU 13 receives the unlock request (step S11) and starts up with the unlock request as a trigger (step S12).

The zone B-ECU 13 controls the locking mechanism 72 to unlock the doors of the vehicle V (step S13).

Then, when the user operates the SSSW 73 to request starting up the drive system device 60, the operation unit ECU 50E detects the operation of the SSSW 73. The operation unit ECU 50E notifies that the SSSW 73 is operated to the zone B-ECU 13.

The zone B-ECU 13 receives the notification indicating the operation of the SSSW 73 (step S14) and executes the authentication processing (step S16). In the authentication processing, the zone B-ECU 13 controls the key communication ECU 50C to detect the electronic key 4 located in the vehicle V via the communication unit 71 and acquires authentication information from the electronic key 4. The zone B-ECU 13 uses the authentication information acquired from the electronic key 4 to determine whether or not the electronic key 4 is the legitimate electronic key 4 for operating the vehicle V.

When starting the authentication processing, the zone B-ECU 13 transmits an authentication start notification indicating the start of the authentication processing to the central ECU 2 (step S15).

Upon reception of the authentication start notification from the zone B-ECU 13, the central ECU 2 detects the start of the authentication processing and starts up (step S21). Here, the central ECU 2 detects that a specific event that is the authentication processing is started. The starting up the central ECU 2 means that the central ECU 2 shifts from the stopped state or the low power consumption state to a normal operating state.

The central ECU 2 transmits a control signal to the zone A-ECU 11 in response to the occurrence of the specific event (step S22). The control signal transmitted by the central ECU 2 in step S22 may be a signal that triggers the zone A-ECU 11 to switch the relay 115 on, and the content of the signal is not limited. In the present embodiment, the central ECU 2 transmits a start-up instruction, which is the control signal indicating the start-up of the drive system device 60, in response to the start-up instruction of the drive system device 60 by the SSSW 73 (step S22).

The zone A-ECU 11 starts up with the reception of the start-up instruction from the central ECU 2 as a trigger (step S31). Then, with the start-up of the zone A-ECU 11, the zone A-ECU 11 switches the relay 115 on (step S32). As a result, the drive system device 60 starts up. Specifically, when the relay 115 is switched on in step S32, the output of the power source P1 and the power source P2 is started. This enables the drive control unit 55 to control the drive system device 60, and the drive system device 60 becomes ready to start up, Then, the zone A-ECU 11 causes the drive control unit 55 to execute control to start up the drive system device 60 in response to the start-up instruction in step S22.

FIG. 2 shows the operation when the zone B-ECU 13 successfully authenticates the electronic key 4. The zone B-ECU 13 outputs an authentication result notification to the central ECU 2 indicating that the authentication in step S16 succeeded (step S17).

Upon reception of the authentication result notification from the zone B-ECU 13, the central ECU 2 refers to the result of authentication (step S23). The central ECU 2 transmits an on control signal to the zone A-ECU 11 based on the successful authentication (step S24). The on control signal is a control signal that instructs to turn on the relay 115 to operate the drive system device 60. Since the zone A-ECU 11 has already started up the drive system device 60 when receiving the on control signal from the central ECU 2, the drive system device 60 continues to be in operate.

FIG. 3 shows the operation when the zone B-ECU 13 failed to authenticate the electronic key 4. Since steps S11 to S16, S21 to S22, and S31 to S32 are similar to the steps in FIG. 2, the description thereof is omitted.

When authentication in step S16 failed, the zone B-ECU 13 outputs an authentication result notification indicating that the authentication failed to the central ECU 2 (step S18).

Upon reception of the authentication result notification from the zone B-ECU 13, the central ECU 2 refers to the result of authentication (step S23). The central ECU 2 transmits a shutdown instruction to the zone A-ECU 11 to stop the drive control unit 55 and the drive system device 60 based on the authentication failure (step S25).

The zone A-ECU 11 receives the shutdown instruction from the central ECU 2 and switches the relay 115 off (step S33). As a result, the supply of the power source P1 to the drive control unit 55 and the supply of the power source P2 to the drive system device 60 are stopped, and the operation of the drive control unit 55 and the drive system device 60 is stopped. In addition, the zone A-ECU 11 sops the operation of the zone A-ECU 11 (step S34). Steps S33 to S34 disable the vehicle V from starting up the drive system device 60 and disable the vehicle V from traveling.

In this way, the vehicle control device 1 in the present embodiment performs the authentication processing (step S16) using the zone B-ECU 13 in response to the start-up request from the user. When starting the authentication processing, the vehicle control device 1 executes notification to the zone A-ECU 11 via the central ECU 2 and switches the relay 115 on. As a result, the drive system device 60 starts up or becomes ready to start up without waiting for the result of the authentication processing, which provides an advantage that the response performance from the start-up request of the user to the start-up of the drive system device 60 is very high.

Figure 4:
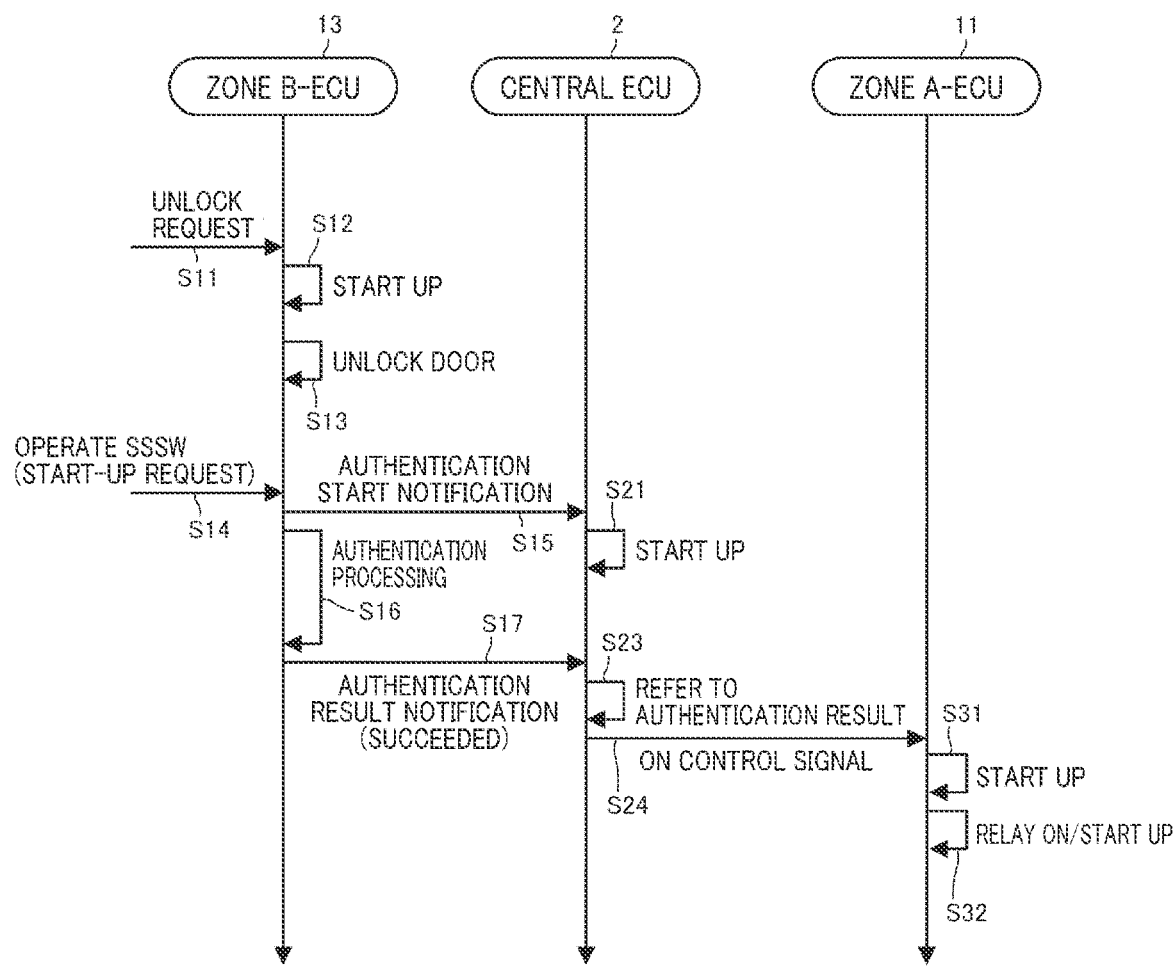
FIG. 4 is a sequence diagram showing another operation example of the vehicle control device.

FIG. 4 is a sequence diagram showing an operation example of another vehicle control device 1, which is different from FIGS. 2 and 3, that is, FIG. 4 shows the operation of the vehicle control device 1 when the authentication processing is not set as the specific event. The operation is a comparative example of the operations in FIGS. 2 and 3. The operation in FIG. 4, which is similar to those in FIGS. 2 and 3, are designated by the same step numbers, and some of the description thereof are omitted.

In step S21 in FIG. 4, upon reception of the authentication start notification from the zone B-ECU 13, the central ECU 2 detects that the authentication processing is started (step S21). At this point, the central ECU 2 starts up, though when the authentication processing is not the specific event, the central ECU 2 waits until the authentication processing of the zone B-ECU 13 is completed.

After the zone B-ECU 13 completes the authentication processing, the central ECU 2 receives the authentication result notification from the zone B-ECU 13 and refers to the result of authentication (step S23). The central ECU 2 transmits an on control signal to the zone A-ECU 11 based on the successful authentication (step S24).

In this case, the zone A-ECU 11 starts up with the reception of the on control signal from the central ECU 2 as a trigger (step S31), and switches the relay 115 on (step S32).

In the operation example shown in FIG. 4, the timing of the relay 115 being switched on is after the authentication result notification in step S17 and the on control signal in step S24. The timing is after the lapse of a significant amount of time from the start-up request made by the user. Specifically, to generate the trigger for the zone A-ECU 11 to switch the relay 115 on, the zone B-ECU 13 needs to transmit notification to the central ECU 2 and the central ECU 2 needs to transmit the instruction to the zone A-ECU 11. Since a series of the communications is CAN communication via the communication line B1 and the communication line B2, communication delay occurs.

Furthermore, since the drive control unit 55 and the drive system device 60 are started up after the start of supplying the power sources P1 and P2, a relatively long time is required. For example, the time required for the engine ECU 50A or the motor ECU 50B to execute the start-up sequence, the time required until the fuel pressure of the fuel pump 63 is stabilized after the start of supplying the power source P2, and the time required for the start-up sequence for the inverter circuit of the travel motor 64 are relatively long. Thus, in the above example, it takes a long time until the vehicle V is ready to travel after the user operates the SSSW 73, which may give an impression that the response performance is poor.

In contrast, in the present embodiment, the power sources P1 and P2 start to be supplied in response to the start of the authentication processing. This makes it possible to start up the drive system device 60 immediately after the start-up request from the SSSW 73 and to make the vehicle V ready to travel. Therefore, excellent response performance can be achieved.

When authentication failed, the zone A-ECU 11 turns the relay 115 off, which disables the drive system device 60 from operating. This can prevent the vehicle V from traveling without the electronic key 4 adapted to the vehicle V, so that the security is ensured.

The difference in operation between FIG. 2 and FIG. 4 is that the central ECU 2 detects the occurrence of a specific event and transmits a start-up instruction (step S22) and that the zone A-ECU 11 turns on the relay 115 based on the start-up instruction (step S32). This means that the operation shown in FIGS. 2 and 3 can be achieved by providing the central ECU 2 with the function of detecting the specific event and providing the start-up instruction to cause the zone A-ECU 11 to turn on the relay 115.

In the above example, description has been given by taking the authentication processing by the zone B-ECU 13 as an example of the specific event. The control method of the vehicle control device 1 of the present disclosure can be applied to the events other than the authentication processing. For example, the specific event can be a failure detection processing for the vehicle control device 1.

In the failure detection processing, the vehicle control device 1 executes a self-diagnostic function to detect the failure of the functional units constituting the vehicle control device 1. In the case of performing the failure detection processing and starting up the drive system device 60 in response to operation of the SSSW 73 or the like, the vehicle control device 1 turns on the relay 115 when starting the failure detection processing. In this case, the vehicle control device 1 continues to operate the drive system device 60 when no failure is found by the failure detection processing, and switches the relay 115 off when failure is found out. This makes it possible to start up the drive system device 60 without waiting for the failure detection processing to complete and to thereby achieve enhanced response performance.

3. Another Embodiment

The above embodiment shows a specific example in which the present invention is applied, and does not intend to limit the form of application of the present invention.

For example, in the above embodiment, description has been given of the configuration in which the relay 115 disconnects the power source P1 and the power source P2 from the +B power source and the relay 115 is switched on to enable the drive control unit 55 to operate. Description has also been given of the configuration in which the relay 115 disconnects the power source P2 of the drive system device 60 from the +B power source and the relay 115 is switched on to enable the drive control unit 55 to operate. The configuration of the power sources disconnected by the relay 115 is not limited, and the relay 115 may be configured to disconnect only the power source P2, for example. In this case, the zone A-ECU 11 may start up and stop the ECUs 50 that constitutes the drive control unit 55. The vehicle control device 1 may also include an unillustrated relay that disconnects the power source P2 of the drive system device 60, as a separate component from the relay 115. In this case, the relay 115 functions as a switch unit that disconnects the power source P1. In the configuration, the same effects as the above embodiment can be achieved if the power source P2 starts to be supplied at the timing when the zone A-ECU 11 switches the relay 115 on.

For example, the authentication processing described in the above embodiment is exemplary. Instead of the electronic key 4, an electronic device such as a smartphone and the vehicle control device 1 may communicate to perform the authentication processing. Alternatively, the vehicle control device 1 may read an IC card incorporating an IC chip to perform the authentication processing. The vehicle control device 1 may also perform the authentication processing by authenticating the face, or the like, of the user based on an image captured by the camera mounted on the vehicle V. The vehicle control device 1 may also perform the authentication processing using a biometric authentication device such as a fingerprint reader.

For example, in the above embodiment, the operation corresponding to the request to start up the drive system device 60 has been described. However, the control method of the present disclosure is not limitedly applied to the case of starting the drive system device 60 and is also applicable to the case of operating the functional units or the drive units included in the vehicle V. For example, the control method may also be applied to the case of sounding a horn mounted on the vehicle V.

The configuration of the vehicle control device 1 shown in the above embodiment is also merely exemplary, and the types of the ECUs, the number of the ECUs, and the configuration of the devices to be controlled by the ECUs included in the vehicle control device 1 can be changed in various ways. Moreover, the operations shown in FIGS. 2 to 4 are divided into step units according to the main processing contents for easy understanding of the operations of the vehicle control device 1, and the present invention is not limited by how the operations are divided into processing units or by the name thereof. Depending on the processing contents, the operations may be divided into more step units.

The operations may also be divided so that one step unit may include more processings. The order of the steps may be switched as appropriate.

4. Configuration Supported by Embodiments Disclosed

The embodiments disclosed support the following configurations.

(Configuration 1) A vehicle control device, including: a switch unit that disconnects power supply to at least one of a drive system device involved in driving of a vehicle and a drive control unit that controls the drive system device; a switch control unit that controls the switch unit; and an event detection unit that detects an occurrence of a specific event in the vehicle. The switch unit is capable of switching between an on state for performing the power supply and an off state for stopping the power supply. The switch control unit switches the switch unit to the on state with reception of an on control signal from a control device as a trigger, and switches the switch unit to the on state without receiving the on control signal, when the specific event occurs.

According to the vehicle control device in configuration 1, it is possible to swiftly start power supply to at least one of the drive system device involved in driving of the vehicle and the drive control unit that controls the drive system device. This makes it possible to swiftly put the vehicle in a drivable state and to enhance the response performance.

(Configuration 2) The vehicle control device according to configuration 1, in which the switch control unit switches the switch unit to the on state concurrently with start-up of the switch control unit, when the specific event occurs.

According to the vehicle control device in configuration 2, when the specific event occurs, the switch unit can be switched to the on state more swiftly, and the response performance can further be enhanced.

(Configuration 3) The control device according to configurations 1 or 2, in which the switch control unit allows the switch unit to be switched to the off state in response to a result of the specific event.

According to the vehicle control device in configuration 3, the drive system may be stopped, or the start-up of the drive system may be interrupted based on the result of the specific event. Accordingly, in the case where, for example, it is not appropriate to drive the vehicle, the operation of the drive system device can be stopped. Therefore, it is possible to reflect the result of the specific event on the operation of the drive system device and to also enhance the response performance.

(Configuration 4) The control device according to any one of configurations 1 to 3, in which the specific event is authentication processing for starting up the drive system device.

According to the vehicle control device in configuration 4, in the configuration of performing the authentication processing before the vehicle is driven, the vehicle can be swiftly put in a drivable state by switching the switch unit to the on state without waiting for the completion of the authentication processing.

(Configuration 5) The vehicle control device according to configuration 4, further including, apart from the switch unit and the switch control unit, an authentication unit that is not directly connected to the switch control unit, in which the authentication unit performs the authentication processing.

According to the vehicle control device in configuration 5, the response performance can be enhanced in the configuration where the switch control unit needs to acquire the authentication result of the authentication unit through communication or the like and this tends to lower the response performance due to the influence of communication delay or the like.

(Configuration 6) The vehicle control device according to configuration 5, in which the switch control unit and the event detection unit execute CAN communication via a first communication line, and the event detection unit and the authentication unit execute the CAN communication via a second communication line.

According to the vehicle control device in configuration 6, it is possible to enhance the response performance in the configuration where the authentication result is transferred via the CAN communication.

(Configuration 7) A control method of a vehicle, the vehicle including a switch unit that disconnects power supply to at least one of a drive system device involved in driving of a vehicle and a drive control unit that controls the drive system device, the vehicle using a control unit that switches the switch unit between an on state for performing the power supply and an off state for stopping the power supply, the control method including: switching, by the control unit, the switch unit to an on state with reception of an on control signal from a control device as a trigger; and switching the switch unit to the on state without receiving the on control signal, when a specific event occurs in the vehicle.

According to the control method of a vehicle in configuration 7, it is possible to swiftly start power supply to at least one of the drive system device involved in driving of the vehicle and the drive control unit that controls the drive system device. This makes it possible to swiftly put the vehicle in a drivable state and to enhance the response performance.

(Configuration 8) A non-transitory computer readable storage medium storing a program executed by a computer that controls a switch unit that disconnects power supply to at least one of a drive system device involved in driving of a vehicle and a drive control unit that controls the drive system device, in which the computer is functioned as a switch control unit that switches the switch unit between an on state for performing the power supply and an off state for stopping the power supply, and the switch control unit switches the switch unit to the on state with reception of an on control signal from a control device as a trigger, and switches the switch unit to the on state without receiving the on control signal, when a specific event occurs in the vehicle.

According to the storage medium in configuration 8, it is possible to swiftly start power supply to at least one of the drive system device involved in driving of the vehicle and the drive control unit that controls the drive system device. This makes it possible to swiftly put the vehicle in a drivable state and to enhance the response performance.

REFERENCE SIGNS LIST

1 . . . Vehicle control unit, 2 . . . Central ECU (event detection unit), 4 . . . Electronic key, 11 . . . Zone A-ECU (switch control unit), 13 . . . Zone B-ECU (authentication unit), 50 . . . ECU, 50A . . . Engine ECU, 50B . . . Motor ECU, 50C . . . Key communication ECU, 50D . . . Door control ECU, 50E . . . Operation unit ECU, 55 . . . Drive control unit, 60 . . . Drive system device, 61 . . . Engine, 62 . . . start-up motor, 63 . . . Fuel pump, 64 . . . Travel motor, 71 . . . Communication unit, 72 . . . Locking mechanism, 73 . . . SSSW, 110 . . . Processing unit, 115 . . . Relay (switch unit), 121 . . . Processor (computer), 123 . . . Memory, B1 . . . Communication line (first communication line), B2 . . . Communication line (second communication line), B3, B4 . . . Communication line, P1, P2 . . . Power source, V . . . Vehicle.

What is claimed is:

1. A vehicle control device, comprising:
   a relay that switches between an on state for performing power supply and an off state for stopping the power supply, the power supply being to at least one of a drive system device involved in driving of a vehicle and a drive ECU (Electronic Control Unit) that controls the drive system device;
   a switch ECU that controls the relay; and
   an event detection ECU that detects that processing of a specific event is started, wherein
   when the event detection ECU detects start of the processing of the specific event the event detection ECU transmits to the switch ECU a first control signal indicating start-up of the drive ECU,
   when receiving the first control signal, the switch ECU controls the relay to switch to the on state for performing the power supply to the drive system device and the drive ECU, and
   in response to a result of the processing of the specific event, the event detection ECU controls the switch ECU to control the relay to continue the on state of the relay or to switch the relay to the off state.

2. The vehicle control device according to claim 1, wherein
   the switch ECU switches the relay to the on state concurrently with start-up of the switch ECU, when the processing of the specific event is started.

3. The vehicle control device according to claim 1, wherein the specific event is authentication processing for starting up the drive system device.

4. The vehicle control device according to claim 3, further comprising, apart from the relay and the switch ECU, an authentication ECU that is not directly connected to the switch ECU, wherein
   the authentication ECU performs the authentication processing.

5. The vehicle control device according to claim 4, wherein
   the switch ECU and the event detection ECU execute CAN communication via a first communication line, and
   the event detection ECU and the authentication ECU execute the CAN communication via a second communication line.

6. A control method executed by a vehicle control device mounted on a vehicle, the vehicle including: a relay that switches between an on state for performing power supply and an off state for stopping the power supply, the power supply being to at least one of a drive system device involved in driving of the vehicle and a drive ECU (Electronic Control Unit) that controls the drive system device; a switch ECU that controls the relay; and an event detection ECU that detects that processing of a specific event is started, the control method comprising:
   detecting, using the event detection ECU, that processing of the specific event is started;
   when detecting start of the processing of the specific event, transmitting from the event detection ECU to the switch ECU a first control signal indicating start-up of the drive ECU and making the switch ECU control the relay to switch to the on state for performing the power supply to the drive system device and the drive ECU; and in response to a result of the processing of the specific event, controlling the switch ECU to control the relay to continue the on state of the relay or to switch the relay to the off state.

7. A non-transitory computer readable storage medium storing a program executed by a computer mounted on a vehicle, the vehicle including a relay that switches between an on state for performing power supply and an off state for stopping the power supply, the power supply being to at least one of a drive system device involved in driving of the vehicle and a drive ECU (Electronic Control Unit) that controls the drive system device; a switch ECU that controls the relay; and an event detection ECU that detects that processing of a specific event is started, wherein the computer executes processing:
detecting, via the event detection ECU, that processing of the specific event is started;
when detecting start of the processing of the specific event, transmitting from the event detection ECU to the switch ECU a first control signal indicating start-up of the drive ECU and making the switch ECU control the relay to switch to the on state for performing the power supply to the drive system device and the drive ECU,
in response to a result of the processing of the specific event, controlling the switch ECU to control the relay to continue the on state of the relay or to switch the relay to the off state.

* * * * *